Patented Aug. 13, 1946

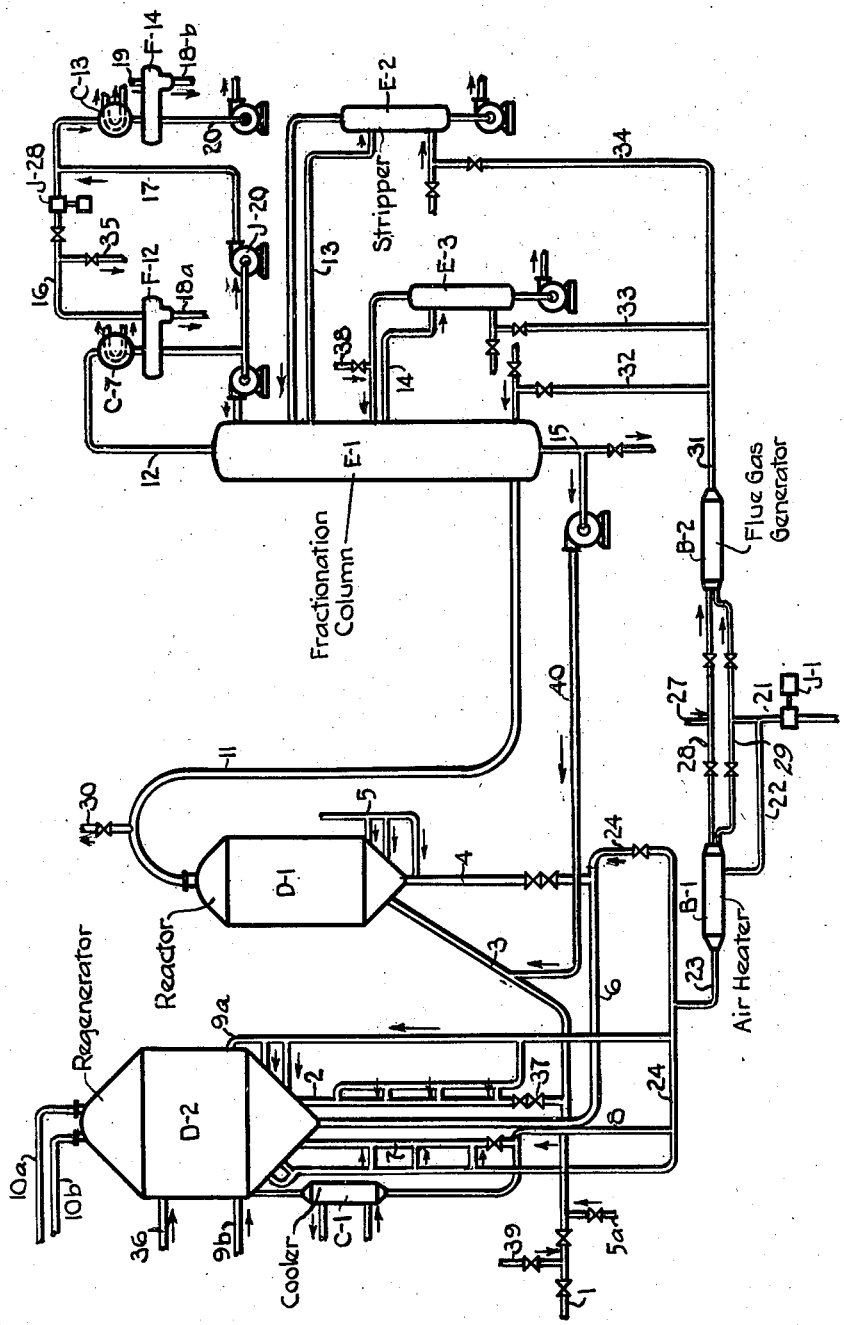

2,405,922

UNITED STATES PATENT OFFICE 2,405,922

FLUID CATALYST CATALYTIC CRACKING

Joseph B. Wyman, Roxana, Ill., and Henry D. Loeb, San Francisco, Calif., assignors to Shell Development Company, San Francisco, Calif., a corporation of Delaware Application June 1, 1945, Serial No. 597,000

2 Claims. (Cl. 196—52)

This invention relates to catalytic cracking and related conversions of hydrocarbon oils in fluid catalyst systems. More particularly, the invention relates to a method for initiating catalytic cracking in fluid catalyst catalytic cracking systems which afford certain advantages and eliminates certain dangers that are inherent in the present methods.

Fluid catalyst catalytic cracking, as the name implies, denotes a catalytic cracking process in which the cracking catalyst in the form of a fine powder is utilized while in a fluidized or so-called pseudo-liquid state, as distinguished from pellets or a freely suspended powder. A characteristic of fluid catalyst catalytic cracking is that the finely divided cracking catalyst is continuously circulated through a cracking zone and through a separate regeneration zone. There are two main systems of fluid catalyst catalytic cracking and several modifications of each.

In one of the systems the catalytic cracking is effected in a so-called up-flow or top-draw-off reactor. In this system the vaporous hydrocarbon product leaves the reactor at the top carrying in suspension an amount of catalyst substantially equivalent to the amount continuously supplied to the reactor at the bottom with the feed. The bulk of the suspended catalyst is separated in a separate chamber or apparatus and returned to the reactor or regenerator, and the vaporous product passes to a fractionating system. In the other main system the catalytic cracking is effected in a so-called down-flow or bottom-draw-off reactor. Since this latter system is the most widely used of the two, a typical modification of such a system will be used in explaining and illustrating the process of the invention. However, the process of the invention is applicable to both systems. To assist in this description, reference is had to the attached drawing forming a part of this specification wherein there is shown by means of diagrammatic figures not drawn to scale a simplified flow of the more pertinent portions of what is known in the art as a standard fluid catalyst catalytic cracking plant.

In operation the oil to be cracked, after suitable preheating, enters via line 1. This oil picks up a quantity of the freshly regenerated catalyst from standpipe 2 of regenerator D—2 and the mixture passes via line 3 to the reactor D—1. Line 3, in one actual case, is two lines, each 25 inches inside diameter. In reactor D—1 there is maintained a more or less constant level of fluidized catalyst. In order to maintain this level, a portion of the partially spent catalyst is continuously withdrawn via standpipe 4. Before entering the standpipe the catalyst is partially stripped or flushed of hydrocarbons by contact with stripping steam introduced at the bottom of the reactor via line 5. The partially spent catalyst withdrawn via standpipe 4 is picked up by a stream of regeneration gas (air) and carried via line 6 to the regenerator D—2. In order to maintain a positive control of temperature and prevent overheating of the catalyst in the regenerator, a portion of the fluidized catalyst is continuously withdrawn via standpipe 7 and circulated back to the regenerator through a recycle catalyst cooler C—1 by means of air introduced via line 8. The regenerator is provided with inlets such as 9a and 9b provided with nozzles for the injection of torch oil to supply additional heat when it is necessary. The regeneration gases after passing through the fluidized bed of catalyst undergoing regeneration are passed through internal cyclone separators (not shown) to separate and recover the major part of suspended catalyst particles and then leave the regenerator via lines 10a and 10b. These gases are cooled and passed through a Cottrell precipitator or other means of recovery to remove additional amounts of suspended catalyst, but since this has no bearing on the invention it has not been included in the diagram.

Returning to the reactor, the hydrocarbon vapors after passing through the bed of fluidized catalyst are passed through internal cyclones (not shown) to separate and recover the bulk of the suspended catalyst. The vapors then pass overhead via line 11 to fractionating column E—1. Reactor D—1 in one instance is about 21 feet in diameter and about 47 feet in height. Line 11 is 36 inches inside diameter by about 820 feet long. Fractionator E—1 is 16 feet in diameter and 76 feet in height. In fractionator E—1 the product is separated into four fractions: (1) A light fraction including gasoline and product gases which is withdrawn overhead via line 12; (2) a light gas oil which is withdrawn via line 13 to a side stripper E—2; (3) a heavy gas oil which is withdrawn via line 14 to a side stripper E—3; and (4) a slurry which is withdrawn from the bottom via line 15. This slurry consists of finely divided catalyst which escaped separation in the internal cyclones of D—1 (for example, 50 tons per day) suspended in a portion of the unconverted oil. This slurry is frequently passed through a thickener and the concentrated slurry returned to the reactor. Since, however, this has no bearing on the invention, the thickening step has not been indicated in the diagram. The vaporous overhead product withdrawn via line 12 is passed through a cooler (condenser C—7) by which the temperature is reduced to such an extent that the main portion of the normally liquid products is condensed. The product is then passed to a fractionator reflux drum F—12. Condensed water may be withdrawn via line 18a. A portion of the hydrocarbon condensate is usually recycled to the fractionating column to serve as reflux. The uncondensed gases are withdrawn from the top via line 16 and compressed by compressor J—28. The remainder of the liquid hydrocarbon product from F—12 is then added via line 17 and pump J—29 and the mixture further cooled in cooler C—13. The product passes to an intermediate gas separator F—14. Further amounts of condensed water may be withdrawn via line 18b. Hydrocarbon gas is withdrawn via line 19. The liquid condensate is withdrawn via line 20. In practice a second stage of compression and cooling is usually employed and the products are then subjected to rectified absorption to recover a dry gas and a stabilized distillate. However, these operations have no bearing on the present invention and have not been indicated in the diagram.

While the operation of the system as above described is basically quite simple, it is by no means simple to start up such a plant. The operation ordinarily supplies its own heat, steam, etc., from the regeneration of the spent catalyst. Consequently, none of the apparatus is fired. There is, however, an enormous amount of metal and catalyst which has to be brought up to a relatively high temperature before any oil can be introduced into the unit. Furthermore, it is essential that the catalyst be kept continuously moving in order to avoid serious plugging of valves, lines, etc. Furthermore, the equipment represents a very large investment and is easily damaged by allowing any one of a number of variables such as weight of catalyst, pressure, temperature, and velocity of catalyst to exceed certain rather restricted limits. Even if the equipment is not damaged the plugging of a line or some other upset causing loss of circulation may require shutting the plant down, cleaning and starting all over again.

In the method in common use the regenerator is brought up to temperature by the burning of torch oil; the reactor is brought up to temperature first by steaming and then by recirculation of hot catalyst; and the fractionating equipment is brought up to temperature by the use of superheated steam. When everything is at a suitable temperature and otherwise ready, oil is cut in and then the conditions of flow are gradually adjusted to give the desired operation. This method of starting up, although in general use, has several elements of danger, both with respect to the equipment and to the operating personnel. The greatest danger lies in the fractionating section. It is extremely difficult and time-consuming to bring every inch of the large apparatus and numerous lines to a temperature above about 250° F. to insure the absence of liquid water remaining from the previous processing or condensed from the steam used for heating. If even small plugs of water are present in the system there is great danger of damaging the fractionating column. There is danger of collapsing the fractionating column due to a temporary steam failure, plugged valves, or carelessness. Finely divided catalyst must be kept out of the fractionating system until such time as oil is cut in. If this is not carefully looked after, the lines will become plugged. Also, even small amounts of finely divided catalyst can do great damage if allowed to pass over into the compressor J—28. These elements of danger can be minimized by exceptionally carefully managed cooperation of the several chosen and trained operators. They are nevertheless there and real, and become of increasing importance as the valves, instruments, etc., become less dependable due to the erosion and corrosion of previous periods of use.

The start-up procedure of the present invention, which has been tested and adopted in commercial plants, differs materially from the conventional procedure. Its main advantage over the conventional procedure is in the substantial elimination of the more important of these hazards. The start-up of a fluid catalyst catalytic cracking plant, according to the process of the invention, may be described in connection with the attached diagram as follows:

After checking the equipment, compressor J—1 is started and air is blown via lines 21, 22, 23, 24 and 6 to the regenerator D—2. Some air is also passed via lines 23, 24 and 8 through recycle cooler C—1. Air may also be introduced into the regenerator and/or reactor system at other points, as considered desirable or convenient.

Air heater B—1, using gas introduced under pressure via lines 27 and 28, is started. Part of the air is passed via lines 21 and 29 to the combustion zone and the remainder is passed via lines 21 and 22 to the heater. The hot air containing some flue gas (for example, 15% oxygen) is passed to the regenerator and reactor systems as described. Part of the hot air is removed from the regenerator, for instance, via lines 10a and 19b, and part is removed from the top of the reactor, for instance, from vent 30 at the top of line 11.

Likewise, air and gas are introduced via lines 29 and 28 to a flue gas generator B—2 to produce a hot relatively inert gas which is passed via lines 31, 32, 33 and 34 to various parts of the fractionating section. The hot flue gases are likewise withdrawn via vent 30 at the top of line 11. A portion may also be withdrawn via line 35 to flush out line 12, cooler C—7, separator F—12 and line 16. Vent 30 and line 35 are preferably throttled to maintain a positive pressure of, for instance, 5 p. s. i. in fractionator E—1.

Cooling water may be circulated through condensers C—7 and C—13.

The various aeration bleeds may be cut in to various parts of the reactor and regenerator systems, as desired. In those cases where steam is used as an aeration medium, superheated steam is preferably cut in as the temperature reaches about 500° F. Thus, for example, superheated steam is cut in to reactor D—1 via lines 5 and 5a when the reactor temperature is above 300° F. and preferably 500° F. Care is taken that the flow in line 11 between the fractionator and vent 30 is towards vent 30.

When the temperature in regenerator D—2 is above about 500° F., catalyst is slowly introduced via line 36, the rate of addition being such that the temperature does not fall below about 450° F. Valve 37 is closed so that only superheated steam is introduced into the reactor. When sufficient catalyst has been introduced (for example, 150 tons or more), catalyst is transferred to the reactor via line 3 and circulation of catalyst between the reactor and regenerator is started.

Steam introduced via lines 5a and 1 may be used for this purpose.

When the temperature in the regenerator is about 600° F. the combustion of torch oil introduced via lines 9a and 9b is started. The catalyst inventory is gradually increased and the temperature of the hot air introduced into the regenerator is gradually reduced by cutting back in the fuel supplied to air heater B—1. In the meantime the fractionator is being heated by the hot inert flue gas. The lower section of the fractionating tower E—1 is also preferably flushed with a hot heavy oil such as gas oil introduced, for example, via line 38.

When the temperature of the catalyst is about 750° F. and the temperature in fractionator E—1 is at least 230° F., outlet 30 is closed and line 35 is opened sufficiently to avoid excessive pressure in the fractionator E—1. The gas in fractionator E—1 is now a mixture of hot inert flue gas from flue gas generator B—2 and superheated steam from the reactor, with the direction of flow reversed. Circulation of catalyst is continued until the temperature of the catalyst is in the neighborhood of 775° F.–800° F., and the oxygen content of gases withdrawn via line 35 is below a safe limit, (for instance, 0.2%), at which time the flow of flue gas to the reactor is displaced by a flow of fuel gas (such as refinery or natural gas) introduced via lines 39 and 1. This gas passes through the reactor and the fractionator and the gas compression system, line 35 being closed. This gas may advantageously be recycled through the conventional gas absorption plant (not shown), the rate being gradually increased.

During this period of catalyst recycle a small amount of the catalyst is carried over into the lower section of the fractionator E—1. When the concentration of the catalyst in the oil in the bottom of the fractionator becomes sufficient to produce a suitable slurry (for example, 4% catalyst), circulation of the slurry to the reactor via lines 15 and 40 may be started. At this time the reactor temperature should be above 700° F.

Feed oil is then gradually cut into the reactor via line 1, the recirculation of gas via line 39 being discontinued, and the conditions of temperature, flow rates, etc., adjusted.

It will be noticed that in the described example of start-up procedure, the reactor-regenerator system and the fractionation system are heated and flushed with two separate gas streams flowing in opposite directions and issuing at a common point between the two systems. The gas circulated through the reaction system is hot air, then hot air plus steam, then steam alone, and finally steam alone plus hydrocarbon gas, while the gas circulated through the fractionation system is hot flue gas substantially free of oxygen, later flue gas plus steam, and finally steam plus hydrocarbon gas. The direction of flow of the hot inert flue gas in the fractionation system and the slight positive pressure prevents the introduction of any air or steam from the reactor entering the fractionation system and avoids all danger of collapse of the fractionating column due to a partial vacuum. This system allows cooling water to be circulated in the condenser C—7 and C—13 during start-up and avoids the danger of damaging these pieces of equipment. It will also be noted that in the described procedure no steam is introduced into the system initially. Also, during the initial stages of the use of steam, the steam is used in conjunction with the hot air or hot flue gas. This system avoids the condensation of appreciable amounts of water and avoids the danger of blowing out the plates of the fractionation column when feed is cut in due to slugs of water. Aside from avoiding the several dangers, the process of the invention is advantageous in that the amount of superheated steam required is much less than in the conventional practice. This is, of course, of considerable economic importance not only because of the cost of superheated steam, but also in view of the smaller boiler capacity required to supply the plant. By using the described start-up procedure the plant may be brought on stream in at least as short a time as that required using the conventional start-up procedure; in many instances considerable operating time may be gained by the smoothness of coming "on-stream."

We claim as our invention:

1. In bringing on stream a fluid catalyst cracking plant comprising a reactor system comprising a fluid catalyst reactor and a fractionation system comprising a fractionating column, said fractionation column communicating directly with said reactor, the combination of steps comprising heating the reactor by passing hot air therethrough and simultaneously heating the fractionating column by passing hot flue gas substantially free of oxygen therethrough, withdrawing said gases as a common stream from a point between said reactor and said fractionating column, thereby confining said gases to the respective systems, and continuing the passage of said gases until the temperatures in the systems are sufficiently high to allow the introduction of superheated steam without substantial condensation to water.

2. In bringing on stream a fluid catalyst cracking plant comprising a reaction system comprising a fluid catalyst reactor and a fractionation system comprising a fractionating column, said fractionating column communicating directly with said reactor, the combination of steps comprising heating the reactor by passing hot air therethrough, simultaneously heating said fractionation column by passing hot flue gas substantially free of oxygen therethrough, withdrawing said gases as a common stream from a point between said reactor and said fractionation column, continuing the passage of said hot air until the temperature in the reaction system is above the condensation temperature of superheated steam and then substituting superheated steam for the hot air, continuing the passage of said hot flue gas through the fractionation column until the temperature is above the condensation temperature of superheated steam, then discontinuing the withdrawal of gases from said point between said reactor and said fractionation column and withdrawing the superheated steam from the reactor through the fractionating system with said hot flue gas, and finally discontinuing the use of said hot flue gas and purging the reactor and fractionation system by cycling hydrocarbon gas with said steam seriatim therethrough.

JOSEPH B. WYMAN.
HENRY D. LOEB.